(12) United States Patent
Kastl et al.

(10) Patent No.: US 11,759,980 B2
(45) Date of Patent: Sep. 19, 2023

(54) METHOD FOR REMOVING LENS FORMING MATERIAL DEPOSITED ON A LENS FORMING SURFACE

(71) Applicant: ALCON INC., Fribourg (CH)

(72) Inventors: Stefan Kastl, Aschaffenburg (DE);
Steffen Paulekuhn, Hanau (DE);
Stephan Pirl, Dietzenbach (DE);
Gabriela Cocora, Aschaffenburg (DE)

(73) Assignee: Alcon Inc., Fribourg (CH)

( * ) Notice: Subject to any disclaimer, the term of this patent is extended or adjusted under 35 U.S.C. 154(b) by 0 days.

(21) Appl. No.: 17/083,559

(22) Filed: Oct. 29, 2020

(65) Prior Publication Data

US 2021/0129391 A1     May 6, 2021

Related U.S. Application Data

(60) Provisional application No. 62/928,548, filed on Oct. 31, 2019.

(51) Int. Cl.
*B29D 11/00* (2006.01)
*B29C 33/72* (2006.01)

(52) U.S. Cl.
CPC ........ *B29C 33/72* (2013.01); *B29D 11/00125* (2013.01)

(58) Field of Classification Search
CPC .................... B29C 33/72; B29D 11/00125
See application file for complete search history.

(56) References Cited

U.S. PATENT DOCUMENTS

| | | | |
|---|---|---|---|
| 2006/0037700 A1* | 2/2006 | Shi | H01J 37/32027 156/345.43 |
| 2010/0239783 A1 | 9/2010 | Mao et al. | |
| 2013/0147072 A1* | 6/2013 | Bothe | B29C 33/72 264/1.36 |

FOREIGN PATENT DOCUMENTS

| | | | |
|---|---|---|---|
| EP | 1332856 A1 | | 8/2003 |
| JP | 2005-246667 | * | 9/2005 |
| JP | 2005246667 A | | 9/2005 |
| KR | 100946385 B1 | | 3/2010 |
| WO | 2010071691 A1 | | 6/2010 |

* cited by examiner

*Primary Examiner* — Mathieu D Vargot
(74) *Attorney, Agent, or Firm* — Sheng-Hsin Hu

(57) ABSTRACT

A method of removing a lens forming material deposited on a lens forming surface (1) of a reusable glass mold for forming ophthalmic lenses, in particular contact lenses or intraocular lenses, comprises the steps of providing a plasma (2), exposing the lens forming surface (1) of the reusable glass mold to the plasma (2) for removing the lens forming material deposited on the lens forming surface (1). The plasma (2) is generated under atmospheric pressure and potential-free, or is generated under reduced pressure.

5 Claims, 4 Drawing Sheets

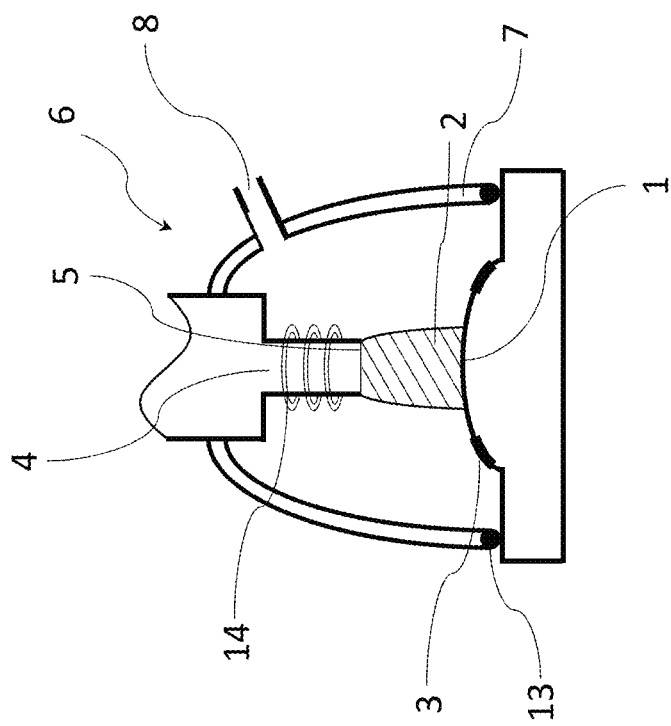
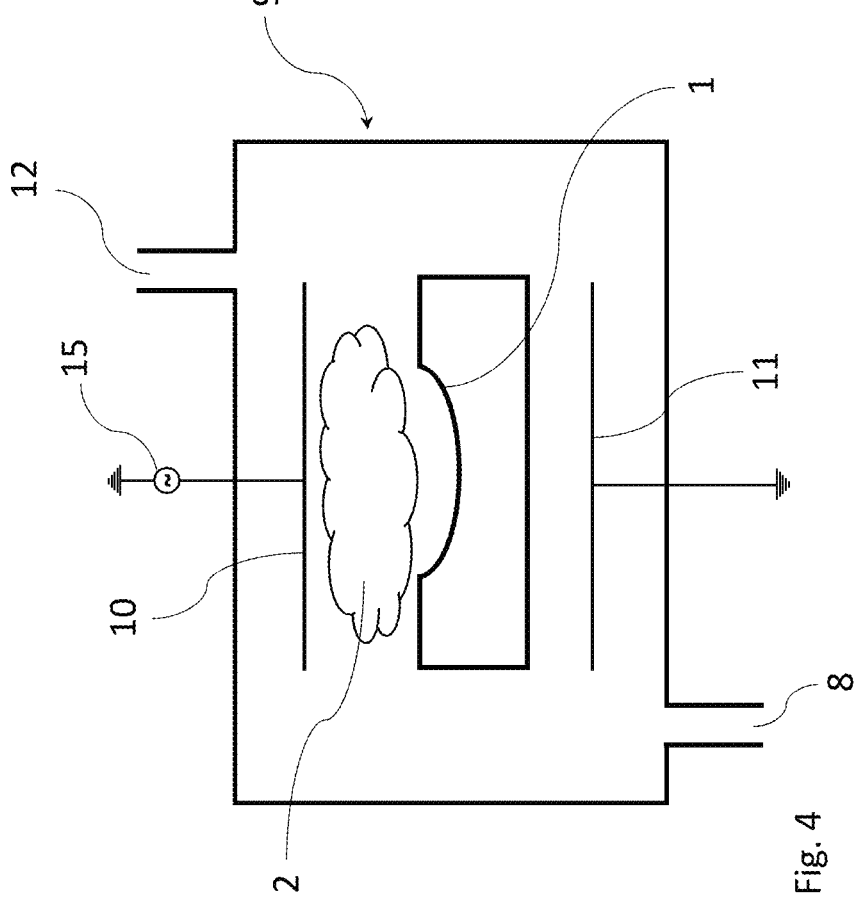
Fig. 5
Fig. 4

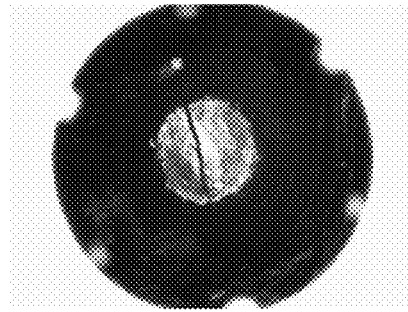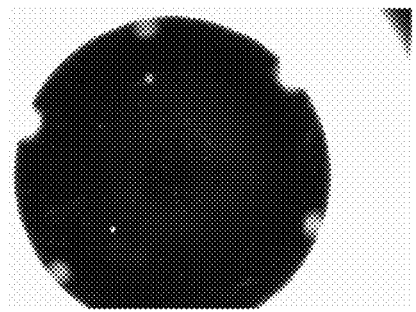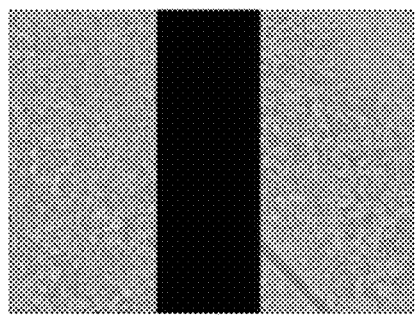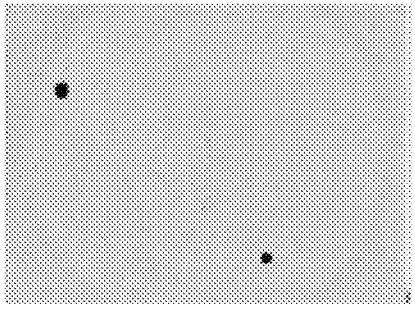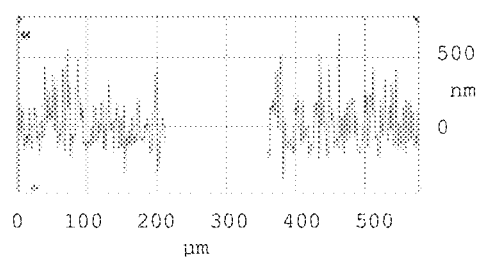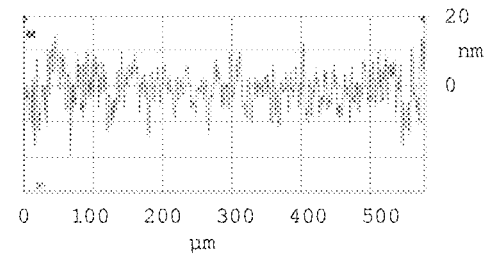
Fig. 6a
Fig. 6b

METHOD FOR REMOVING LENS FORMING MATERIAL DEPOSITED ON A LENS FORMING SURFACE

FIELD OF THE INVENTION

The invention relates to a method of removing lens forming material deposited on a lens forming surface of a reusable glass mold for forming ophthalmic lenses, in particular contact lenses or intraocular lenses.

BACKGROUND

It is known to produce ophthalmic lenses, in particular intraocular lenses or contact lenses such as soft contact lenses, in an automated manufacturing process using reusable glass molds. In mass production of contact lenses, specifically disposable lenses which are worn only once and are then disposed of, a high number of contact lenses must be manufactured in a relatively short period of time. In an embodiment of such process for the mass production of soft contact lenses, a lens forming material, for example a polymer or prepolymer solution, is introduced into a female mold half, the mold is closed by the respective male mold half, and then the lens forming material is polymerized and/or cross-linked with the aid of ultraviolet (UV) light to form the contact lens. The mold is subsequently opened and the lens is removed from the male or female mold half of the opened mold. Suitable polymers formed by photochemical polymerization of suitable prepolymers include polymers based on polyvinyl alcohols (PVA) or silicone hydrogels (SiHy).

After removal of the lens from the male or female mold half, the male and female mold halves are cleaned so as to remove any lens forming material or other residues that may have deposited on the lens forming surface. During cleaning of the mold, the lens forming surface is exposed to a jet of a cleaning liquid, which may comprise deionized water and/or organic solvents, and is subsequently dried. However, despite this cleaning process the deposits may not absolutely completely be removed from the lens forming surface. And although such minimal amounts of deposits may accumulate on the lens forming surface over a considerable number of production cycles, they are so small that the contact lenses produced are well within the specifications as regards their optical and geometrical properties, so that these lenses are not detected as being defective during optical inspection. The residues on the lens forming surface may be so small that over a considerable number of production cycles they may not even be visible on the lens forming surfaces. However, as the number of production cycles continues to grow the deposits on the lens forming surface may accumulate more and more until they may reach a level where the contact lenses are detected as not being within the specifications during the inspection process. From that time on, continuing production of contact lenses using this mold would lead to contact lenses which are rejected due to the lenses being outside the specifications.

Therefore, in order to obtain fault-free contact lenses which are well within the specifications the deposits must be reliably removed from the lens forming surface on a regular basis, and in particular the deposits have to be removed before they have accumulated to an amount where the contact lenses produced from the mold having the accumulated deposits on its lens forming surface are detected as being defective. And while methods for abrasively cleaning these deposits from the reusable glass molds are available, such abrasive cleaning may result in the lens forming surface of the glass mold getting damaged, and this lens forming surface is a surface that must have optical quality and must be able to stand a high number of production cycles. Since the reusable glass molds are very expensive, abrasion of the lens forming surface must be prevented while at the same time the lens forming surface must be reliably cleaned.

Other cleaning methods of physically cleaning the lens forming surface which are gentle to the surface do not show satisfactory removal of the deposited lens material and hence will lead to an accumulation of deposits on the lens forming surface over time as well. Such methods are therefore not suitable for reliably cleaning the lens forming surfaces.

It is therefore an object of the present invention to provide a method for reliably removing the deposits from the lens forming surface of a reusable glass mold for forming ophthalmic lenses, in particular from the lens forming surface of a reusable glass mold for forming contact lenses, without damaging the lens forming surface.

SUMMARY

These and still further objects are met by the method of removing lens material deposited on a lens forming surface of a reusable glass mold according to the invention. Further improvements of the invention and preferred embodiments are subject of the respective dependent claims.

As used in the specification including the appended claims, the singular forms "a", "an", and "the" include the plural, unless the context explicitly dictates otherwise. When using the term "about" with reference to a particular numerical value or a range of values, this is to be understood in the sense that the particular numerical value referred to in connection with the "about" is included and explicitly disclosed, unless the context clearly dictates otherwise. For example, if a range of "about" numerical value a to "about" numerical value b is disclosed, this is to be understood to include and explicitly disclose a range of numerical value a to numerical value b. Also, whenever features are combined with the term "or", the term "or" is to be understood to also include "and" unless it is evident from the specification that the term "or" must be understood as being exclusive.

In particular, the present invention suggests a method of removing lens forming material deposited on a lens forming surface of a reusable glass mold for forming ophthalmic lenses, in particular contact lenses or intraocular lenses, the method comprising the steps of
providing a plasma,
exposing the lens forming surface of the reusable glass mold to the plasma for removing the lens forming material deposited on the lens forming surface,
wherein the plasma is generated under atmospheric pressure and potential-free, or is generated under reduced pressure.

A potential-free plasma under atmospheric pressure may be generated by a plasma arc between two electrodes, wherein one electrode is at ground potential.

Particularly, the potential-free plasma is generated by means of a high-voltage DC discharge having a voltage in the range of 5 kV to 15 kV, and a pulsation in the range of 10 kHz to 100 kHz resulting in a pulsed electric arc, wherein one of the electrodes is at ground potential.

Reduced pressure plasma is generated under a pressure in the range of 0.1 mbar to 0.5 mbar.

According to one aspect of the method according to the invention, the lens forming surface exposed to the plasma is provided with an annular mask made from metal, in particular chromium, the annular mask being arranged to surround the lens forming surface.

According to a further aspect of the method according to the invention, the method additionally comprises a step of aspirating an off-gas generated by exposing the deposited lens forming material to be removed to the plasma.

According to still a further aspect of the method according to the invention, generating the plasma under atmospheric pressure comprises generating the plasma with a plasma jet using air as process gas.

The plasma jet is also known as plasma jet system using the plasma jet method for generating the atmospheric plasma.

Particularly, the plasma may be customized by the admixture of an additional gas to the plasma formed. Such additional gas may be selected from the group consisting of argon, oxygen, air, tetrafluoromethane, nitrogentrifluoride and sulfurhexafluoride, or mixtures thereof.

According to yet a further aspect of the method according to the invention, the plasma is generated with a plasma generator at an output power of at least 150 W, particularly in the range of 150 W to 500 W, very particularly in the range of 200 W to 400 W, and the air is injected into the plasma jet at a pressure in the range of 5 bars to 8 bars.

Still in accordance with a further aspect of the method according to the invention, during injection into the plasma jet the air has a flow rate in the range of 1000 l/h to 2000 l/h, particularly in the range of 1300 l/h to 1700 l/h.

In accordance with another aspect of the method according to the invention, the plasma jet has an outlet orifice at the tip of the plasma jet, and exposing the lens forming surface to the plasma comprises arranging an apex of the lens forming surface at a distance in the range of 3 mm to 7 mm from the outlet orifice of the tip of the plasma jet.

In case of a convex lens forming surface the apex of the lens forming surface is the uppermost point of the lens forming surface, whereas in case of a concave lens forming surface the apex is the lowermost point of the lens forming surface.

Yet in accordance with another aspect of the method according to the invention, the plasma is generated with the aid of a plasma torch comprising a plasma jet, a tubular plasma jacket and a aspirator connection, the plasma jacket surrounding the space between the plasma jet and the lens forming surface of the mold, and the method further comprises applying underpressure to the aspirator connection, thereby allowing aspiration of the off-gas.

To allow the aspiration of the off-gas, the plasma torch is not air-tightly associated with the glass mold. Either the plasma jacket remains arranged at a distance from the glass mold, or the plasma jacket comprises venting slits in the vicinity of the glass mold, allowing ambient air to enter the plasma torch and to be sucked away together with the off-gas through the aspirator connection.

In particular, the lens forming surface is exposed to the plasma for a time period not exceeding 20 seconds, preferably for a time period in the range of 1 second to 20 seconds, and more preferably for a time period in the range of 1 second to 5 seconds.

In accordance with a further aspect of the method according to the invention, exposing the lens forming surface to the plasma under reduced pressure, in particular at a pressure in the range of 0.1 mbar to 0.5 mbar, is performed using a parallel plate reactor having two electrodes or using a plasma excitation coil, and applying a (volume) power density between the two electrodes or via the plasma excitation coil in the range of 5 kW/m$^3$ to 20 kW/m$^3$.

In accordance with a still further aspect of the method according to the invention, exposing the lens forming surfaces to the plasma is performed in a treatment chamber provided with the parallel plate reactor, and the lens forming surface is arranged between the two electrodes of the parallel plate reactor.

In accordance with another aspect of the method according to the invention, the plasma is generated with the aid of a plasma torch comprising the parallel plate reactor having the two electrodes or with the aid of the plasma excitation coil for generating the plasma, a tubular plasma jacket and a vacuum connection, the plasma jacket sealingly surrounding the space between the parallel plate reactor or the plasma excitation coil and the lens forming surface of the reusable glass mold, thereby allowing the exposure to reduced pressure to be confined to the glass mold comprising the lens forming surface.

Particularly, the lens forming surface is exposed to the plasma for a time period not exceeding 10 minutes, preferably for a time period in the range of 1 minute to 10 minutes, and more preferably for a time period in the range of 1 minute to 5 minutes.

According to a further aspect of the method according to the invention, a process gas passing between the two electrodes of the parallel plate reactor for forming the plasma is a process gas selected from the group consisting of oxygen, air, argon, tetrafluoromethane, nitrogentrifluoride and sulfurhexafluoride, or mixtures thereof.

As regards the method of manufacturing an ophthalmic lens, in particular a contact lens or an intraocular lens, the method comprises the steps of providing a reusable glass mold comprising a first mold half and a second mold half, each of the first and second mold halves having a lens forming surface, introducing a lens forming material into the first mold half or the second mold half, assembling the first and second mold halves to close the mold such that the lens forming material is arranged between the lens forming surfaces of the first and second mold halves, exposing the lens forming material arranged between the lens forming surfaces of the first and second mold halves to energy to polymerize and/or crosslink the lens forming material to form the ophthalmic lens, disassembling the first and second mold halves to open the mold, and removing the ophthalmic lens from the first mold half or from the second mold half, wherein the lens forming surface of either both the first and second mold halves or of only one of the first and second mold halves is cleaned by using a method according to any one of the preceding claims prior to introducing the lens forming material into the first mold half or the second mold half.

According to one aspect of the method of manufacturing an ophthalmic lens according to the invention, the mold halves are reused to manufacture a plurality of ophthalmic lenses, and the lens forming surface(s) of one of the first and second mold halves or of both the first and second mold halves is/are exposed to the plasma again after having manufactured a predetermined number of ophthalmic lenses.

According to an alternative aspect of the method of manufacturing an ophthalmic lens according to the invention, the mold halves are reused to mold a plurality of ophthalmic lenses, and the lens forming surface(s) of one of the first and second mold halves or of both the first and mold halves is/are exposed to the plasma prior to the manufacturing of each ophthalmic lens.

According to a further aspect of the method of manufacturing an ophthalmic lens according to the invention, the ophthalmic lens is a soft contact lens, in particular a silicone hydrogel soft contact lens.

The afore-mentioned aspects of the method according to the invention have a number of advantages. One advantage is the surprisingly excellent removal of lens material from the lens forming surfaces without using abrasive methods. One would have expected such gentle method be less efficient than an abrasive method. The method according to the invention therefore allows the reliable manufacture of ophthalmic lenses, in particular contact lenses or intraocular lenses, without any lenses being produced which are outside the specifications due to too much deposits having accumulated on the lens forming surface of the molds. Such deposits are removed before they have accumulated to an extent that they would lead to defective lenses being manufactured and without deteriorating the reusable glass mold.

Hence, the number of cycles of reuse of the very expensive glass molds is substantially increased without impairing the quality of the manufactured ophthalmic lenses.

The method may be either performed in-line in a fully automated or semi-automated process for manufacturing ophthalmic lenses, or may be performed off-line separate from such fully automated or semi-automated process for manufacturing ophthalmic lenses. In the latter case, the reusable glass molds comprising the lens forming surfaces to be cleaned have to be removed from the automated production line for being cleaned after a predetermined number of production cycles (numbers of contact lenses produced using the respective reusable glass mold). For example, after 600 production cycles the reusable glass molds may be cleaned in-line or may be removed from the production line and be cleaned off-line.

However, due to the very efficient removal of the lens forming material, and hence the only short exposure time needed, the method can be readily integrated in an existing automated production line, particularly when using plasma exposure under atmospheric pressure. No downtime of the production line is required using the method according to the invention, the cleaning of the lens forming surfaces may be done in-line within the duration of the production cycle of an ophthalmic lens. No removal of the reusable glass mold comprising the lens forming surface to be cleaned from the production line is required, and there is no need to interrupt the production cycles. Also, no substitute molds are required which would be required in case of removal of the glass molds from the manufacturing line for off-line cleaning. The removal of the lens forming material using plasma may thus be easily automated, leading to even shorter overall treatment times.

In addition, the method according to the invention only requires low maintenance, and is therefore particularly suitable for the mass production of ophthalmic lenses.

Furthermore, the method is advantageous in connection with reusable glass molds or mold halves, especially in connection with molds made of quartz glass provided with a metallic annular mask. The method allows for an easy plasma exposure to plasma of lens forming surfaces provided with the metallic annular mask arranged on at least one mold half and surrounding the lens forming surface and defining the edge of the ophthalmic lens to be manufactured. Such molds comprising a metallic annular mask may be treated by the method according to the invention without confining the plasma to the lens forming surface to shield the metallic annular mask from being exposed to the plasma. This advantage is achieved by the use of a potential-free plasma or by the use of plasma under reduced pressure. Under reduced pressure, no electric arc is generated. Such electric arc would generate a plasma which may deteriorate the metallic mask on the mold.

Aspiration of the off-gas avoids contamination of the production line. The reaction products formed during plasma treatment—in case of silicone hydrogel as a lens forming material and depending on the process gas and an admixture of an additional gas, silicon dioxide or silicon tetrafluoride may be generated, for example—may contaminate the production line during plasma treatment. This is to be avoided in order to maintain the strict requirements which are in place for the manufacture of ophthalmic lenses.

When the plasma treatment is performed under atmospheric pressure, it is capable of particularly easily being integrated into a mass production process for the manufacture of ophthalmic lenses, in particular into a mass production process for the manufacture of contact lenses, particularly soft contact lenses, or intraocular lenses.

The use of gases or mixtures of gases, respectively, as described are then easy to handle and do not require any specific precautionary measures nor do they require any special treatment ovens or the like additional equipment.

It goes without saying that in fully automated production lines for the mass production of ophthalmic lenses, in particular soft contact lenses or intraocular lenses, a plurality of molds or mold halves may be arranged in side by side configuration, in order to simultaneously manufacture a higher number of lenses. For an effective production, the lens forming surfaces of this plurality of molds or mold halves—at least a number of the plurality of molds or mold halves—can be simultaneously exposed to the plasma.

Advantages were already described for the method of removing lens forming material deposited on a lens forming surface and apply to the method of manufacturing an ophthalmic lens as well.

It is to be noted, that each individual feature described herein as well as all combinations of two or more such features are possible as long as such features are not mutually exclusive or are otherwise technically incompatible.

The afore-mentioned embodiments are practical embodiments of removing lens material deposited on a lens forming surface of a reusable glass mold for forming ophthalmic lenses.

Further embodiments and advantages become apparent from the following description of detailed embodiments of the method and system according to the invention with the aid of the drawings.

BRIEF DESCRIPTION OF THE DRAWINGS

Further advantageous aspects of the invention become apparent from the following
description of embodiments of the invention with the aid of the drawings in which:

FIG. 4 shows an exemplary embodiment of an apparatus for carrying out the method according to the invention using a plasma under reduced pressure;

FIG. 5 shows an alternative embodiment of an apparatus for carrying out the method according to the invention using a plasma under reduced pressure;

FIG. 6a shows a picture and a diagram showing the thickness of a lens forming material deposition on a lens forming surface of a reusable glass mold, the picture being taken by a white light interferometer before exposure of the lens forming surface to the plasma under reduced pressure; and FIG. 6b shows a picture and a diagram showing the thickness of a lens forming material deposition on the lens forming surface of the reusable glass mold shown in FIG. 6a, the picture being taken by a white light interferometer after exposure of the lens forming surface the to plasma under reduced pressure.

The present invention will be described in connection with certain preferred embodiments. However, it is to be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION

The following description of exemplary embodiments of the invention is for illustrative purposes only and is not intended to limit the scope of the invention.

FIGS. 1 to 3b are related to a method according to the invention in which the lens forming surface of the reusable glass mold is exposed to plasma under atmospheric pressure using a potential-free plasma.

Figure 2:
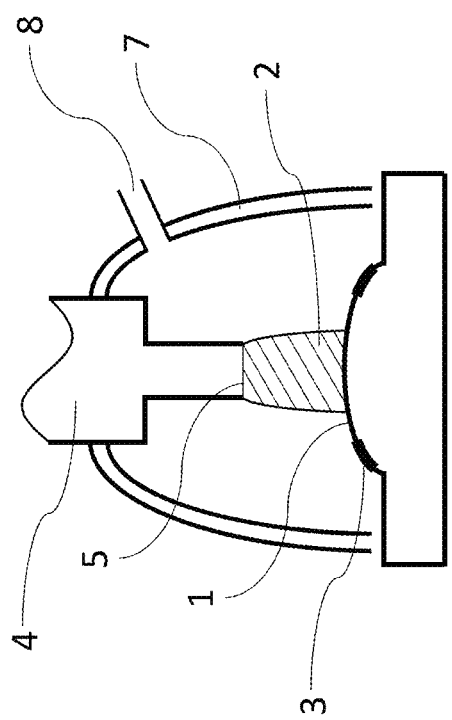
FIG. 2 shows an alternative embodiment of an apparatus for carrying out the method according to the invention using a plasma under atmospheric pressure.
Figure 1:
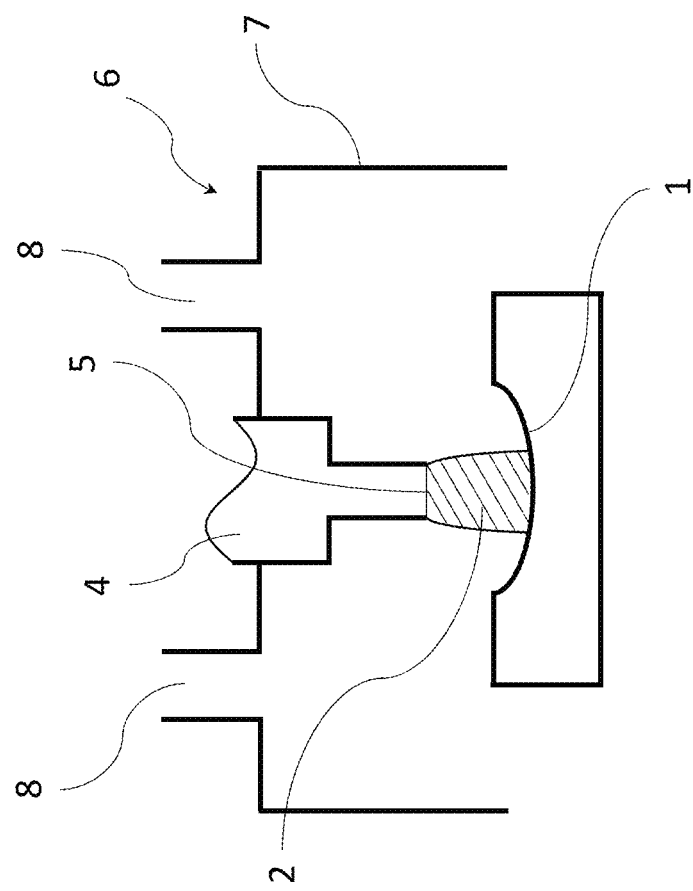
FIG. 1 shows an exemplary embodiment of an apparatus for carrying out the method according to the invention using a plasma under atmospheric pressure.

FIG. 1 shows a reusable female glass mold half the concave lens forming surface 1 of which is exposed to a potential-free atmospheric plasma 2 in accordance with the method of the instant invention. FIG. 2 shows a reusable male glass mold half the convex lens forming surface 1 of which is exposed to a potential-free atmospheric plasma 2 in accordance with the method of the instant invention. In case of the male mold half shown in FIG. 2, the lens forming surface 1 comprises an annular mask 3 made of metal. For example, the annular mask 3 can be made from chromium or from any other suitable metal.

FIG. 1 and FIG. 2 show embodiments of the method according to the present invention in which the plasma 2 is generated with the aid of a plasma torch 6 comprising a plasma jet 4, a tubular plasma jacket 7 and an aspirator connection 8. The plasma jacket 7 surrounds the space between the plasma jet 4 and the lens forming surface 1 of the respective glass mold (female or male, respectively).

The plasma 2 is generated by means of a high-voltage discharge in the range of 5 kV to 15 kV of a DC generator at a pulsation rate in the range of 10 kHz to 100 kHz. Compressed air flows past the pulsed electric arc generated in the discharge section, and is thereby excited and converted to the plasma state. This plasma then passes through the jet head and through the plasma jet orifice 5 to impinge on the lens forming surface 1 to be treated. The jet head is at ground potential and holds back any voltage/potential-carrying parts of the plasma stream, thereby generating a potential-free plasma.

The plasma jacket 7 is arranged on or around the glass mold comprising the lens forming surface 1 to be cleaned. The plasma jacket is arranged such that the mask 3 is—at least partially—located within the region where the plasma 2 contacts the glass mold. The plasma jet 4 is arranged generally above the plasma jacket 7. The plasma jet 4 has a plasma gas nozzle that extends into the plasma jacket 7. At its tip, the plasma gas nozzle is provided with an outlet orifice 5 having a diameter of about 3 millimeters, for example. In operation, the outlet orifice 5 of the plasma gas nozzle is arranged above an apex of the lens forming surface 1 at a distance not exceeding 7 mm and not smaller than 3 mm.

The plasma jacket 7 is arranged such that it is not in air tight contact with the glass mold to create an air vent. This air vent allows ambient air to enter the plasma jacket 7 when an aspirator is connected to the aspirator connection 8. Applying underpressure to the aspirator connection 8 allows aspiration of the off-gas generated during the cleaning of the deposits from the lens forming surface with the aid of the plasma 2.

Figures 3A, 3B:
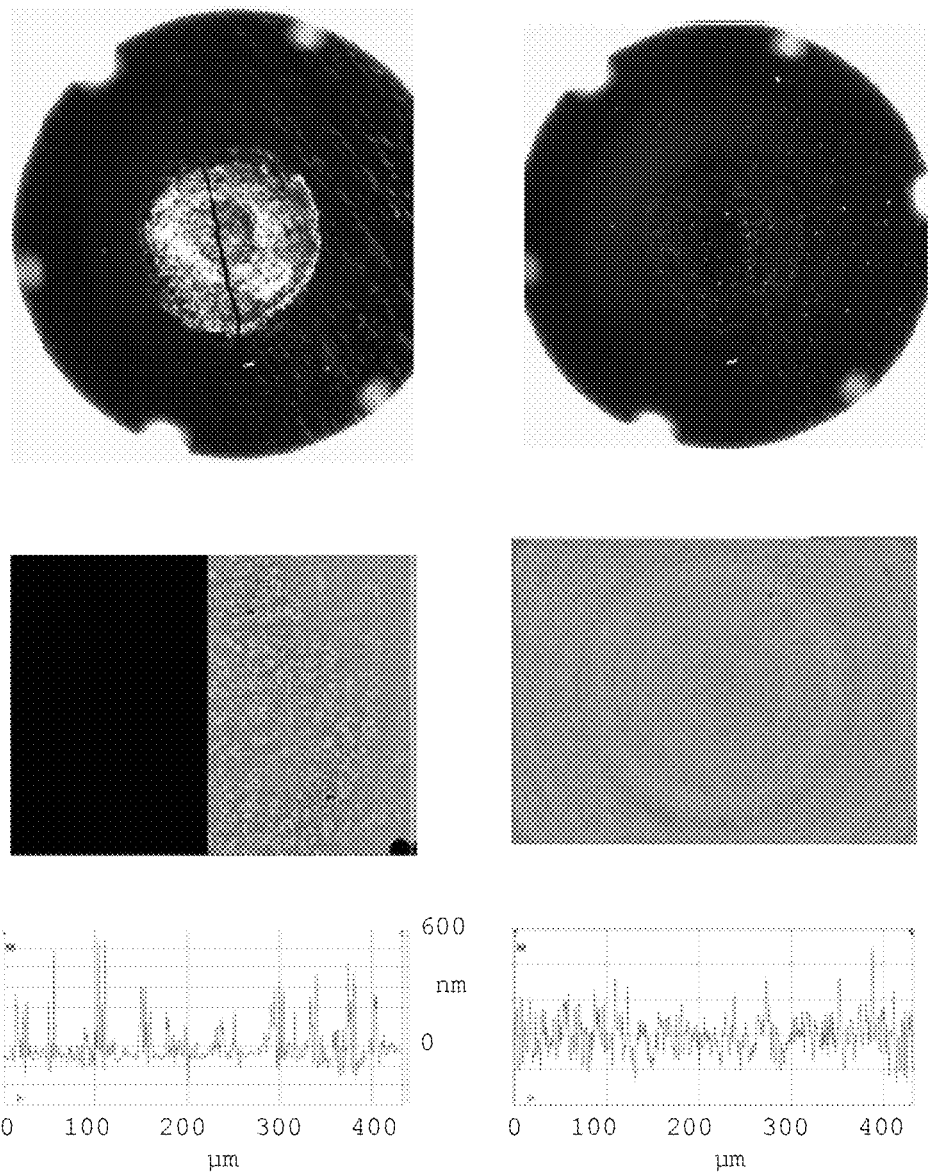
FIG. 3a shows a picture and a diagram showing the thickness of a lens forming material deposition on a lens forming surface of a reusable glass mold, the picture being taken by a white light interferometer before exposure of the lens forming surface to the plasma under atmospheric pressure.
FIG. 3b shows a picture and a diagram showing the thickness of a lens material deposition on the lens forming surface of the reusable glass mold shown in FIG. 3a, the picture being taken by a white light interferometer after exposure of the lens forming surface to the plasma under atmospheric pressure.

FIGS. 3a and 3b show pictures of a lens forming surface of a reusable glass mold, taken with a white light interferometer before plasma treatment (FIG. 3a) and after plasma treatment (FIG. 3b). The diagram of FIG. 3a shows the thicknesses of depositions of lens forming material on the lens forming surface 1 which are in the range of up to 600 nm. After exposure of the lens forming surface 1 to the plasma 2, examination of the same area with the aid of the white light interferometer shows that no depositions of lens forming material can be detected anymore as the heights measured with the interferometer are within random noise (see FIG. 3b).

FIGS. 4 to 6 are related to a method according to the invention in which the lens forming surface of the reusable glass mold is exposed to plasma under reduced pressure.

FIG. 4 shows a reusable female glass mold half. The concave lens forming surface 1 of the female mold half is exposed to a reduced pressure plasma 2 in accordance with the method of the instant invention. FIG. 5 shows a male mold half the convex lens forming surface 1 of which is exposed to a reduced pressure plasma 2 in accordance with the method of the instant invention. In case of the male mold half shown in FIG. 5, the lens forming surface 1 comprises an annular mask 3 made of metal. For example, the annular mask 3 can be made from chromium or from any other suitable metal.

FIG. 4 shows an embodiment of the present invention in which the plasma 2 is generated at a partial vacuum in a treatment chamber 9. The treatment chamber comprises a parallel plate reactor having two parallel plates as electrodes 10, 11. The glass mold with the lens forming surface 1 to be cleaned is arranged between the electrodes 10, 11. The treatment chamber has a vacuum connection 8 for applying the partial vacuum and a process gas supply connection 12 for introducing a process gas into the treatment chamber 9. Prior to exposure of the lens forming surface 1 to the plasma 2, the treatment chamber 9 is flushed with a gas corresponding to that of the plasma 2 (process gas). Alternatively, vacuum may be applied, the treatment chamber may be closed, and subsequently the treatment chamber 9 is flushed with the process gas. This cycle may be repeated several times. Applying underpressure to the vacuum connection 8 allows aspiration of the off-gas generated during the cleaning of the deposits from the lens forming surface with the aid of the plasma 2. Reduced pressure plasma is generated by a plasma generator 15. The excitation may be done at different frequencies such as 40 kHz, 13.56 MHz or 2.45 GHz.

FIG. 5 shows an embodiment of the method of the present invention in which the plasma 2 is generated by a plasma torch 6 comprising a plasma excitation coil 14 for generating the plasma, a tubular plasma jacket 7 and a vacuum connection 8. The plasma jacket 7 sealingly surrounds the space between the plasma excitation coil 14 and the lens forming surface 1 of the mold. By applying vacuum to the vacuum connection 8, reduced pressure is applied to the lens forming surface 1.

The plasma jacket 7 is arranged on the mold of the lens forming surface 1 to be cleaned. A sealing gasket 13 is arranged to contact the mold such that the mask 3 is at least partially arranged within the contact region formed between sealing gasket 13 and the lens forming surface 1. A plasma gas nozzle is arranged generally above plasma jacket 7. The plasma gas nozzle extends into plasma jacket 7. The plasma gas nozzle is provided with an outlet orifice 5 having a diameter of about 3 millimeters (mm), for example. In operation, the outlet orifice 5 of the plasma gas nozzle is arranged above an apex of the lens forming surface 1 at a distance not exceeding 7 mm and not smaller than 3 mm. Prior to exposure of the lens forming surface 1 to the plasma 2, the space within the plasma jacket 7 is flushed with a gas corresponding to that of the plasma to be generated. The flushing time may, for example, be in the range of about 15 seconds to about 30 seconds. Alternatively, vacuum may be applied, the treatment chamber may be closed, and subsequently the treatment chamber 9 is flushed with the process gas. This cycle may be repeated several times.

FIGS. 6*a* and 6*b* show pictures of a lens forming surface of a reusable glass mold, taken with a white light interferometer before plasma treatment (FIG. 6*a*) and after plasma treatment (FIG. 6*b*). The diagram of FIG. 6*a* shows the depositions of lens forming material on the lens forming surface having thicknesses of up to 600 nm. After exposure of the lens forming surface 1 to the plasma 2, examination of the same area with the aid of the white light interferometer shows that no depositions of lens forming material can be detected any more as the heights measured with the interferometer are within random noise (see FIG. 6*b*).

Example

In the following examples reusable glass molds are used comprising a female mold half made of glass (B-270, available from Schott, Germany) and a male mold half made of quartz glass (Lithosil-SQ 1, available from Schott, Germany).

These molds are typically used in an automated continuous mass production process for manufacturing ophthalmic lenses, in particular for manufacturing soft contact lenses. Such a process is described, for example, in WO 2010/071691 from page 21, line 30 to page 23, line 3, as well as from page 5, line 35 to page 6, line 26, which is herein incorporated by reference. After each production cycle in a laboratory set-up of said automated continuous manufacturing process, the mold halves are manually cleaned with a cleaning sponge soaked with 2-propanol. After cleaning with the cleaning sponge, the mold halves are rinsed with water and dried with pressurized air. After drying the concave lens forming surface on the female mold half and/or the convex lens forming surface on the male mold half, the respective mold halves are treated by exposure to a potential-free plasma under atmospheric pressure or by exposure to a plasma under reduced pressure.

The atmospheric plasma is generated by a PlasmaBeam PC, available from Diener electronic GmbH+Co. K G, Ebhausen, Germany, having a maximum internal plasma potential of 10 kV, a fundamental plasma frequency of 20 kHz and an output power setting of 300 W. The PlasmaBeam PC comprises a plasma jet (plasma jet system) and works with the plasma jet method. The atmospheric plasma is generated with pressurized air being the process gas at a flow rate of 1500 l/h and at a pressure of 5 bars.

A plasma jacket is placed concentrically on the lens forming surface. The plasma concentrator is made from an electrically non-conductive material (e.g. polymethylmethacrylate, PMMA). The plasma jet of the PlasmaBeam PC is placed over the plasma jacket such that the outlet orifice 5 of the plasma gas nozzle is arranged at a distance of about 5 mm from the lowermost point of the concave lens forming surface 1.

It is to be noted, that the plasma treatment can be applied to the concave lens forming surface 1 of the female mold half or to the convex lens forming surface 1 of the male mold half, as outlined in the examples.

For a concave lens forming surface 1 the the outlet orifice 5 of the plasma gas nozzle 5 is arranged from a lowermost point of the concave lens forming surface 1 at a distance not exceeding 7 mm and not smaller than 3 mm. For a convex lens forming surface 1 the outlet orifice 5 of the plasma gas nozzle is arranged at a distance not exceeding 7 mm and not smaller than 3 mm from an uppermost point of the convex lens forming surface.

Prior to the exposure of the lens forming surface 1 to the plasma the space within the plasma jacket 7 is flushed with a gas corresponding to the gas of the atmospheric plasma to be generated.

The plasma under reduced pressure is generated in a treatment chamber provided with a parallel plate reactor. After placing the mold comprising the lens forming surface 1 to be treated into the treatment chamber 9, the treatment chamber 9 is flushed with the process gas through the supply opening 12, and by applying vacuum to the opening 8 and flushing the treatment chamber 9 with the process gas several times. The process gas is a gas mixture of 450 sccm oxygen and 110 sccm tetrafluoromethane, and the pressure is adjusted to 0.3 mbar. The plasma generation is performed with the aid of a plasma generator 15 with RF (Radio Frequency) at 13.56 MHz and at a volume power density between the two electrodes 10, 11 of 6 kW/m$^3$. The plasma generator 15 has an output power of 600 W at 13.56 MHz and generates the plasma by capacitive-coupling in a reactor having a volume of 100 l.

The exposure time of the lens forming surface 1 to the reduced pressure plasma is, for example, 5 minutes.

In a still further embodiment of the invention, the plasma treatment may be applied to the lens forming surfaces of both the male and the female mold half, respectively. By varying the treatment time, the degree of removal of the deposited lens forming material from lens forming surfaces can be optimized.

As can be seen from the results, due to the exposure of one or both lens forming surfaces to plasma, the lens forming material deposited on the lens forming surface can be very significantly reduced or even completely removed.

The invention claimed is:

1. Method of removing lens forming material deposited on a lens forming surface (1) of a reusable glass mold for forming contact lenses, the method comprising the steps of:

a) removing a lens from the reusable glass mold,
b) providing a plasma (2),
c) exposing the lens forming surface (1) of the reusable glass mold with the lens forming material deposited thereon after step a) to the plasma (2) for removing the lens forming material deposited on the lens forming surface (1), and
d) aspirating an off-gas generated by exposing the deposited lens forming material to be removed to the plasma (2), wherein lens forming material is a silicone hydrogel, wherein the plasma (2) is generated under atmospheric pressure and potential-free, wherein the generating the plasma (2) under atmospheric pressure comprising generating the plasma (2) with a plasma jet (4) using air as a process gas, and wherein the plasma is generated with the aid of a plasma torch (6) comprising the plasma jet (4), a tubular plasma jacket (7) and an aspirator connection (8), the plasma jacket (7) surrounding the space between the plasma jet (4) and the lens forming surface (1) of the mold, and wherein the method further comprises applying vacuum to the aspirator connection (8), thereby allowing aspiration of the off-gas.

2. Method according to claim 1, wherein the lens forming surface (1) exposed to the plasma (2) is provided with an annular mask (3) made from chromium, the annular mask being arranged to surround the lens forming surface.

3. Method according to claim 1, wherein the plasma (2) is generated with a plasma generator at an output power of in the range of 150 W to 500 W, and wherein the air is injected into the plasma jet at an input pressure in the range of 5 bars to 8 bars.

4. Method according to claim 3, wherein during injection into the plasma jet the air has a flow rate in the range of 1000 l/h to 2000 l/h.

5. Method according to claim 1, wherein the plasma jet (4) has an outlet orifice (5) at the tip of the plasma jet (4), and wherein exposing the lens forming surface (1) to the plasma (2) comprises arranging an apex of the lens forming surface (1) at a distance in the range of 3 mm to 7 mm from the outlet orifice (5) of the tip of the plasma jet (4).

* * * * *